United States Patent
Takada et al.

(10) Patent No.: US 8,638,520 B2
(45) Date of Patent: Jan. 28, 2014

(54) MAGNETIC RECORDING APPARATUS AND DATA READING METHOD

(75) Inventors: Kazuya Takada, Tokyo (JP); Kenji Yoshida, Tokyo (JP)

(73) Assignee: Kabusiki Kaisha Toshiba, Tokyo ( * ) Notice: Subject to any disclaimer, the term of this patent is extended or adjusted under 35 U.S.C. 154(b) by 195 days.

(21) Appl. No.: 13/240,510

(22) Filed: Sep. 22, 2011

(65) Prior Publication Data

US 2012/0127604 A1  May 24, 2012

(30) Foreign Application Priority Data

Nov. 22, 2010 (JP) ............................... P2010-260544

(51) Int. Cl.
*G11B 21/02* (2006.01)

(52) U.S. Cl.
USPC .............................. 360/75; 360/55; 711/163

(58) Field of Classification Search
USPC ........................... 360/55, 75; 711/4, 112, 163
See application file for complete search history.

(56) References Cited

U.S. PATENT DOCUMENTS 7,558,931 B2 * 7/2009 Ishida et al. .................. 711/163

FOREIGN PATENT DOCUMENTS

| JP | 58197562 A | 11/1983 |
| JP | 5158620 A | 6/1993 |
| JP | 6059952 A | 3/1994 |
| JP | 6290000 A | 10/1994 |

* cited by examiner

*Primary Examiner* — Ali Neyzari
(74) *Attorney, Agent, or Firm* — Patterson & Sheridan LLP

(57) ABSTRACT

A magnetic recording apparatus includes: a magnetic disk; a drive device; a magnetic disk control device; a buffer; and a flag management table. The buffer reads data of a specific block unit from a designated read range on the magnetic disk. The flag management table stores a pointer indicating the read location of the buffer for data of each of the block units and a management flag for the pointer. The magnetic disk control device sets the management flag of the pointer corresponding to a given block unit when the data of the given block unit is read to the buffer.

4 Claims, 4 Drawing Sheets

MAGNETIC RECORDING APPARATUS AND DATA READING METHOD

CROSS REFERENCE TO RELATED APPLICATION(S)

The present disclosure relates to the subject matters contained in Japanese Patent Application No. 2010-260544 filed on Nov. 22, 2010, which are incorporated herein by reference in its entirety.

FIELD

Embodiments described herein relate to a magnetic recording apparatus and a method for reading data therefrom.

BACKGROUND

The processing time taken for Error Checking and Correcting (ECC) in a magnetic storage apparatus continues to increase. For example, sometimes when LDPC is employed in decoding, decoding processing is repeated several times for data that fails in decoding.

Traditionally sector data is returned in the sequence of read gate assertion, controlling such that the sequence of sectors read from a medium matches the sequence of sectors transferred to a buffer. Therefore, with for example a Low Density Parity Check (LDPC), when coding is employed where sometimes a significant period of time is required until decoding is completed, when a particular sector takes a significant period of time to decode then subsequent sectors cannot be output to a buffer even if they have completed decoding. To address this issue a large buffer is provided to an ECC controller, and control is made such that the subsequent sectors wait in turn for output to the buffer.

Alternatively, when configuration is made such that sectors can be transferred to a buffer in the sequence with which they complete decoding then a region of continuous space needs to be reserved in the buffer for the sector(s) with prior read gate assertion.

A technology is described in related art in which a storage device for storing data of a portion of a two dimensional data array is provided, data from another device is stored in sequence on the storage device, the sequence of data on the storage device is changed, and then the data is read out and transferred to a control device. However, a prerequisite of the technology employed here is that data is handled as a two dimensional data array and it is not a technology for general data handling.

There is demand for more efficient data reading for general data handling, however no method to achieve this goal is known.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

According to one embodiment, there is provided a magnetic recording apparatus including: a magnetic disk; a drive device; a magnetic disk control device; a buffer; and a flag management table. The buffer reads data of a specific block unit from a designated read range on the magnetic disk. The flag management table stores a pointer indicating the read location of the buffer for data of each of the block units and a management flag for the pointer. The magnetic disk control device sets the management flag of the pointer corresponding to a given block unit when the data of the given block unit is read to the buffer.

Explanation follows regarding exemplary embodiments, with reference to the drawings.
(First Exemplary Embodiment)

Explanation follows regarding a first exemplary embodiment, with reference to FIG. 1 to FIG. 4.

Generally a correction function is incorporated in a data storage device or communication device for detecting and correcting data errors. Such a correction function can, for example, be implemented with an encoding and decoding method employing a Hamming code capable of single-bit correction (shortened Hamming code).

[Disk Drive Configuration]

Figure 1:
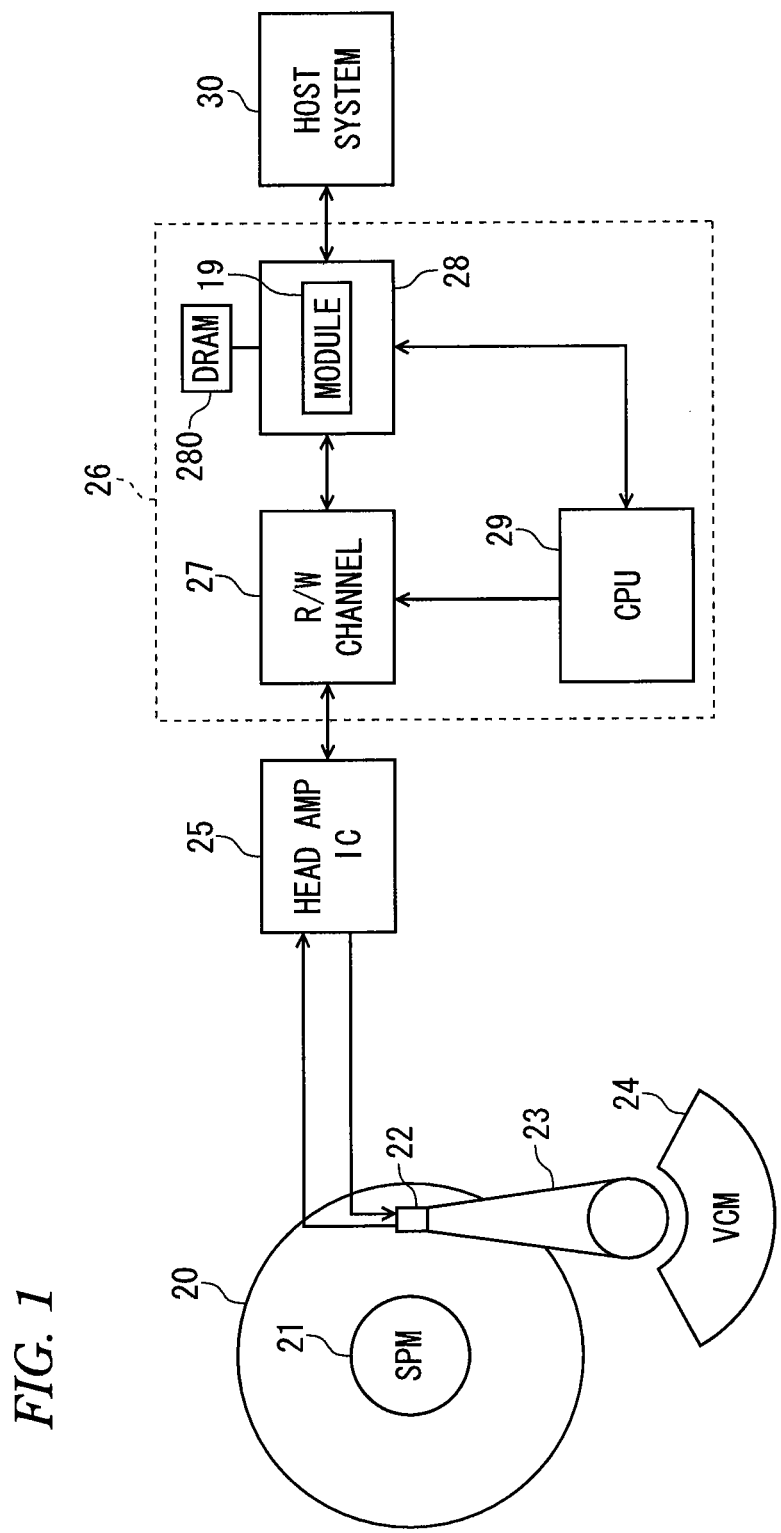
FIG. 1 is a block diagram illustrating relevant portions of a disk drive related to an exemplary embodiment.

FIG. 1 is a block diagram illustrating relevant portions of a hard disk drive (referred to below simply as disk drive) serving as a data storage device for employing an encoding and decoding apparatus of the first exemplary embodiment.

The disk drive is, as shown in FIG. 1, broadly configured with a head-disk assembly (HDA), a head amplifier integrated circuit (referred to below as head amp IC) 25, and a circuit board 26. The HDA includes a disk 20, which is a magnetic recording medium, a spindle motor (SPM) 21, an arm 23 mounted with a head 22 and a voice coil motor (VCM) 24.

The disk 20 is rotated by the SPM 21. The arm 23 and the VCM 24 are configured with an actuator. The actuator controls movement of the head 22 mounted to the arm 23 to a designated position on the disk 20 by driving the VCM 24. The head 22 includes a read head device and a write head device. The read head device reads data stored on the disk 20. The write head device writes data onto the disk 20.

The head amp IC 25 includes a read amplifier and a write amplifier. The read amplifier amplifies a read signal read by the read head device, and sends the amplified signal to a read-write (R/W) channel 27. A write driver sends a write current to the write head device according to write data output from the R/W channel 27.

The circuit board 26 includes the R/W channel 27, a disk controller 28, a microprocessor (CPU) 29, and a buffer memory (DRAM) 280. The R/W channel 27 includes a read channel for performing signal processing on the read data and a write channel for performing signal processing on the write data. The CPU 29 is the main drive controller and performs servo control for positioning the head 22 and data read-write control.

The disk controller 28 performs interface control to control data transfer between a host system 30 and the R/W channel 27. The disk controller 28 includes an encoding and decoding module (not shown) of the first exemplary embodiment, and also includes the encoding and decoding apparatus having a main component of a module 19 typified by a flag pointer manager 32 that is described later. The disk controller 28 controls the buffer memory 280 configured from DRAM, and user data sent from the host system 30 or read data read from the disk 20 is stored in the buffer memory 280.

The processing time taken for Error Checking and Correcting (ECC) in a magnetic storage apparatus continues to increase. When a Low Density Parity Check (LDPC), for example, is employed for decoding, often decoding processing needs to be repeated many times for data that once fails to be decoded.

Traditionally sector date is returned in the sequence in which read gates are asserted, with control performed such that the sequence of sectors read from the medium matches the sequence of sectors sent to the buffer. Therefore, with for example a Low Density Parity Check (LDPC), when coding is employed where sometimes a significant period of time is required until decoding is completed, when a particular sector takes a significant period of time to decode then subsequent sectors cannot be output to a buffer even if they have completed decoding. To address this issue, a large buffer is provided to an ECC controller, and control is made such that the subsequent sectors wait in turn for output to the buffer.

Alternatively, when configuration is made such that sectors can be transferred to a buffer in the sequence with which they complete decoding then a region of continuous space needs to be reserved in the buffer for the sector(s) with prior read gate assertion.

The first exemplary embodiment is directed towards improving such situations. Namely, the first exemplary embodiment is provided with a management table, described later, and dynamically refreshing the management table, at timings of read gate assertion and a decoding completion, enables the integrity of the data in the buffer to be maintained while sectors are being sent to the buffer in the sequence they complete decoding, without having to reserve sufficient space in advance.

Figure 2:
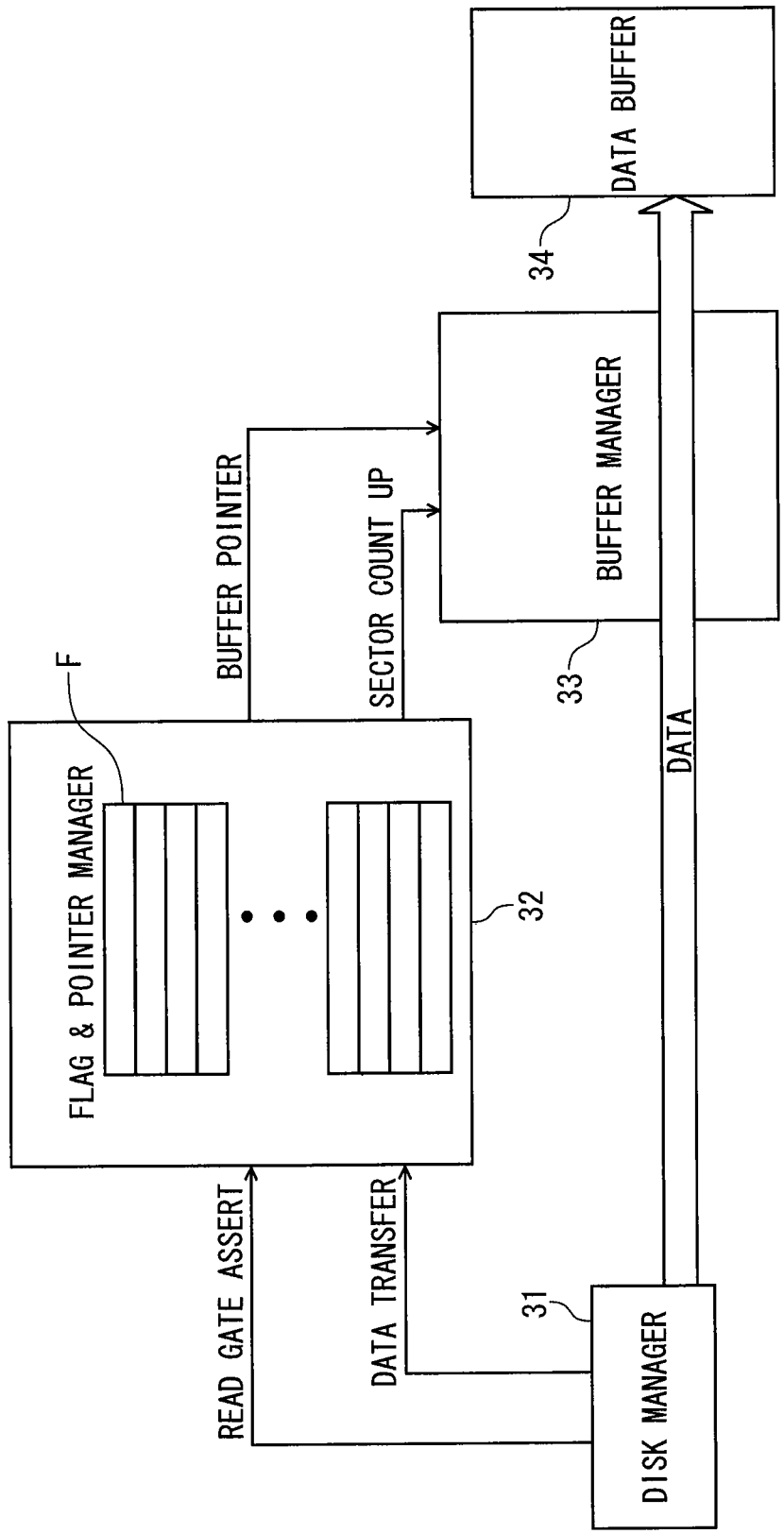
FIG. 2 is a functional block configuration diagram illustrating the exemplary embodiment.

FIG. 2 is a functional block diagram illustrating an exemplary embodiment. The configuration includes a disk manager 31, the flag and pointer manger 32, a buffer manger 33 and a data buffer 34.

The disk manager 31 is a combination module of the R/W channel 27 and the disk controller 28, and is configured to perform read gate assertion and data transfer to the flag and pointer manger 32.

The flag and pointer manger 32 is a module in the disk controller 28, and outputs a buffer pointer and a sector count up to the buffer manger 33.

The buffer manger 33 is a module in the disk controller 28 and transfers data from the disk manager 31 to the data buffer 34 under control from the flag and pointer manger 32. The data buffer 34 corresponds to the buffer memory 280 (collectively referred to below as buffer). The flag and pointer manger 32 includes a flag management table F, described later.

Figure 3:
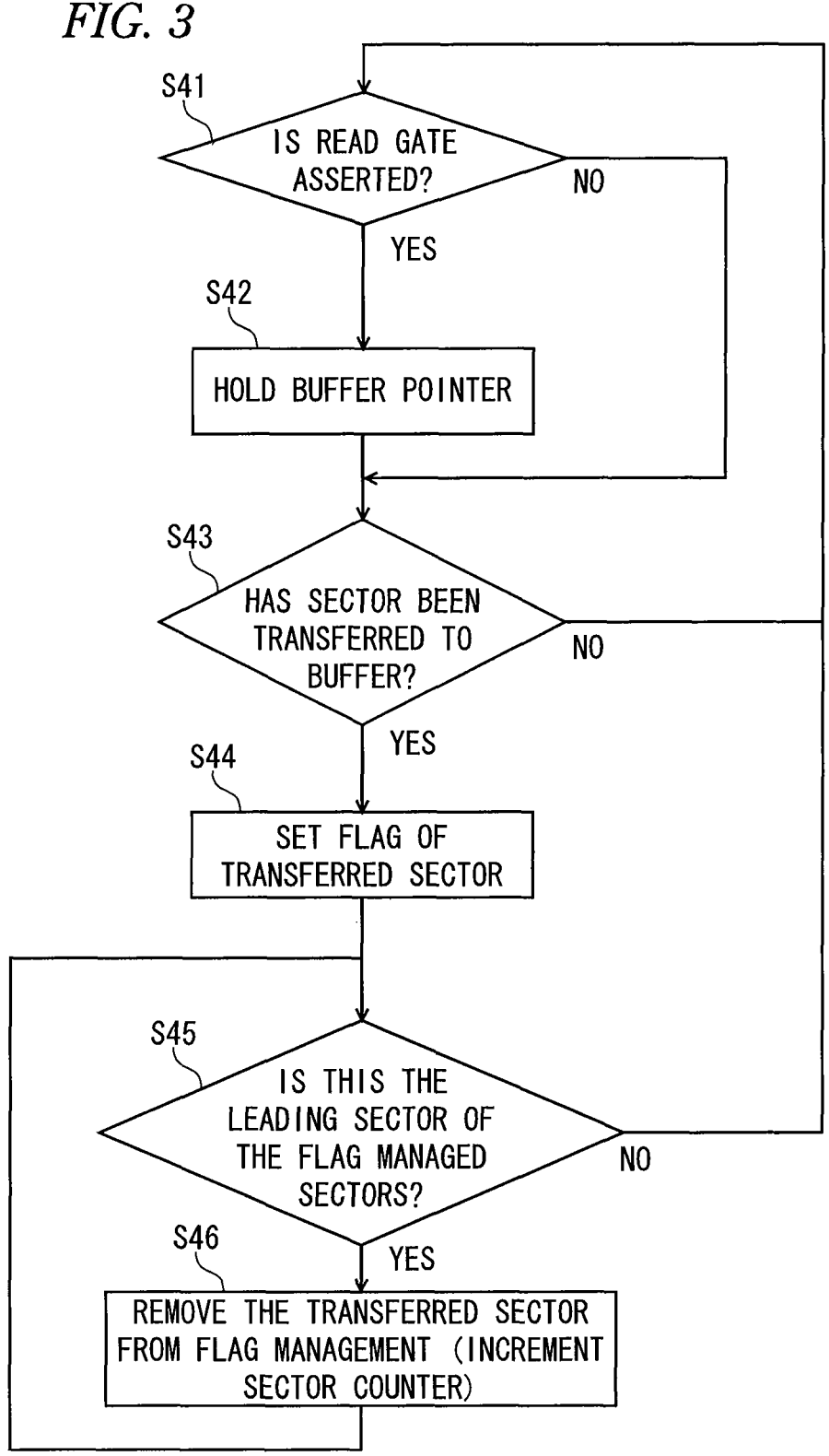
FIG. 3 is a flow chart illustrating a data management method of the same exemplary embodiment.

FIG. 3 is a flow chart illustrating a data management method of the first exemplary embodiment. The data management method is activated when a data read request is received from the host system 30, and is ended on request completion.

Step S41: determination is made as to whether or not a read gate is asserted. Processing proceeds to step S43 when determined that the read gate is not being asserted.

Step S42: when determined at step S41 that the read gate has been asserted, the buffer pointer is held and processing proceeds to step S43.

Step S43: determination is made as to whether or not the sector has been transferred to the buffer. Processing returns to step S41 when determined that transfer has not been made.

Step S44: a flag for the transferred sector is set when determined at step S43 that the sector has been transferred, and processing proceeds to step S45.

Step S45: determination is made as to whether or not the transferred sector is the leading sector out of the flag managed sectors. When determined that the transferred sector is not the leading sector processing returns to step S41.

Step S46: when determined at step S45 that the transferred sector is the leading sector out of the flag managed sectors, the transferred sector is removed from the flag management (the sector counter is incremented) and processing returns to Step S45.

Figure 4:
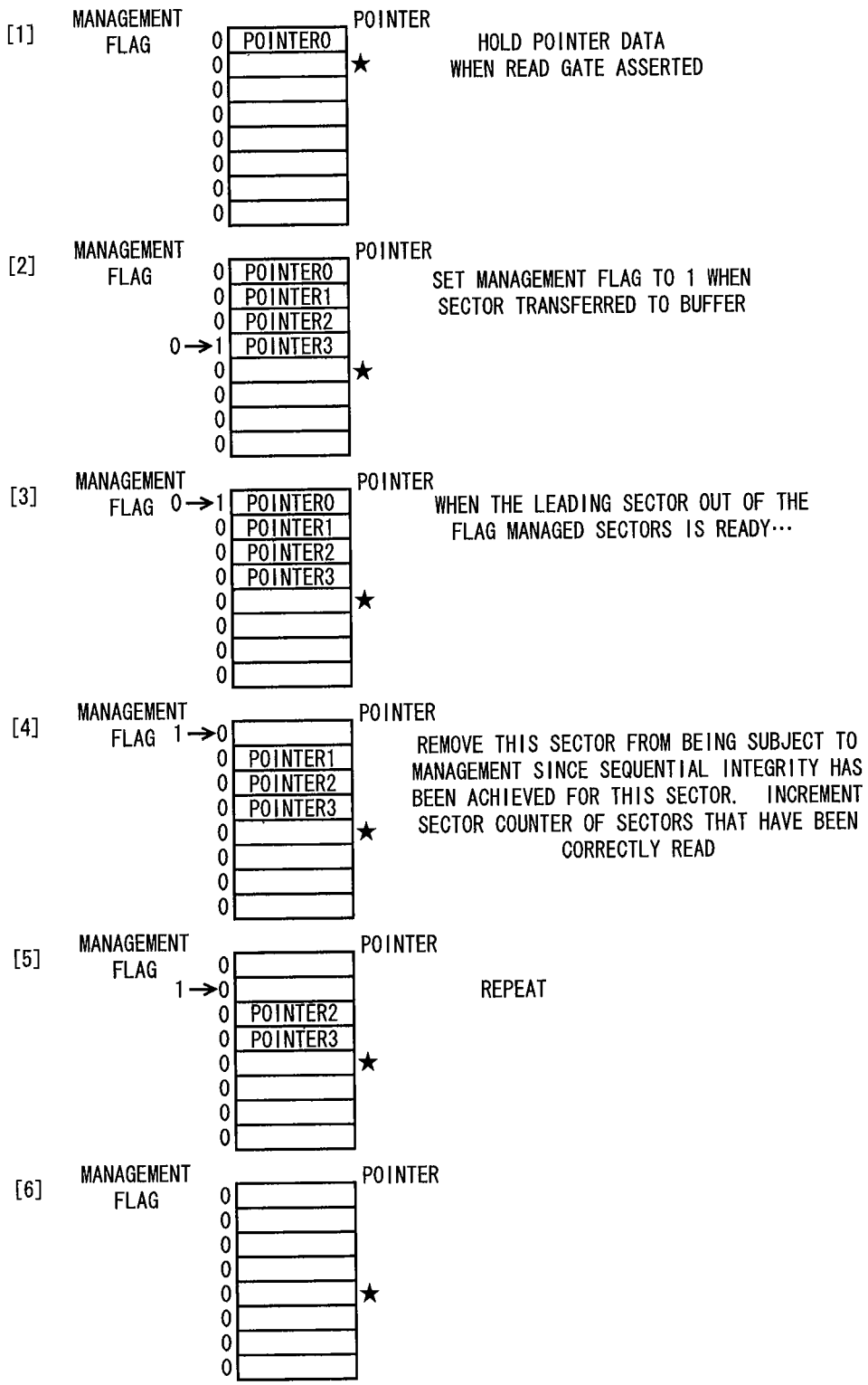
FIG. 4 is a schematic diagram to explain operation of a management flag in the same exemplary embodiment.

FIG. 4 is a schematic diagram for explaining management flag operation in the first exemplary embodiment and corresponds to the operation of FIG. 3. Explanation now follows regarding operation of the table.

First, at a timing of read gate opening (assertion) on the medium, a pointer for where this sector should be inserted on the buffer is held, as shown at section [1] in FIG. 4. The pointer may simply operate sequentially over the buffer, or may link according to link data or wrap. When this is determined to be the case, pointer data is held for where the sector currently read-gate-asserted should be transferred. The pointer need not be managed at the timing of read gate assertion, as long as management can be implemented when the sector is actually transferred to the buffer using a traditional method.

Determination as to whether or not to assert the read gate is determined by whether or not that sector can be stored in the buffer. If such an approach is not adopted, space for storing this sector may not yet be available in the buffer when the time comes for actually storing the sector in the buffer. Situations would result in which sectors were missing in buffer when the buffer became full, leading to complexities in sector management in the buffer. Only asserting the read gate when there is space in the buffer for storing the data ensures that when the buffer becomes full the sectors are always arrayed in the buffer in sequence without gaps.

Similar operation is repeated every time the read gate is asserted. Section [2] in FIG. 4 shows a state in which the read gate has been asserted four times. It can be seen that the fourth sector is just about to be transferred into the buffer. Determination is made from the management table and this sector is to be transferred to the position of pointer 3 in the buffer. The management flag is set to 1 at the point in time of transfer completion of this sector to the buffer. At this point in time, since the sectors in front of this sector (sectors for insertion at pointer 0 to pointer 3) are not yet in place, this sector is treated as if it had not yet having been transferred to the buffer. Namely, the buffer counter is not incremented.

The sectors of pointers 1, 2, 3 are subsequently transferred. Section [3] in FIG. 4 shows a state in which the sector for insertion at pointer 0 has been transferred to the buffer. This means that the leading sector out of the flag managed sectors is now ready. Since this sector has sequential integrity it no longer needs to be flag managed, so the flag is cleared to 0, shown as section [4] in FIG. 4. The sector counter, indicating the sectors than have been correctly stored in the buffer, is incremented (indicating that this data can be transferred to the host).

The leading sector out of the flag managed sectors now becomes the sector of pointer 1.

The sectors at pointer 1 is a flag managed sector with a flag of 1, hence its flag is cleared, similarly to in the explanation of section [4] of FIG. 4, and the sector counter is again incremented, shown as section [5] in FIG. 4. Similar processing is repeated until finally a state is arrived at when the flag management table is empty, as shown in section [6] in FIG. 4. However when this state is arrived at the position of the write pointer in the flag management table has moved from its initial position.

In this example the size of the flag management table F is 8 units, however this size differs according to latency. The latency referred to here is a value of how many sectors worth the read gate can be asserted from when the read gate for a given sector is asserted and that sector is stored in the buffer, until all of the sectors are stored in the buffer for which the read gate was asserted prior to the given sector.

The size of the management table can be suppressed to a minimum by discarding the data in the management table at the point in time when the integrity of sequence for the sectors is achieved.

(Second Exemplary Embodiment)

Explanation now follows regarding a second exemplary embodiment, with reference to FIG. 1 to FIG. 4. Further explanation of points common to the first exemplary embodiment will be omitted.

Occasions arise when a sector is retried and a sector is re-read from the medium when, for example, an uncollectable error is generated. When sectors are transferred to a buffer in a sequence that differs from the sequence read from the medium, as described above, it is possible that sectors further back than the sector for which an uncollectable error is generated have already been stored in the buffer. When this occurs, processing on the disk side can be reduced by utilizing the management table data such that the sectors that have, already been transferred to the buffer are not then re-read from the medium. For example, even though data might have already been read, an uncollectable error necessitating another re-try might still be generated when data is being re-read from the medium. However such a sequence of events can be avoided.

Whereas in the above explanation the sector counter is not incremented until data for the sectors prior to a desired sector are in place, however, in NCQ for example, a host can change the sequence and perform transfer there is no need always to operate such that the sector counter is not incremented in such cases.

Explanation has been given of a data management method for sending data to a buffer irrespective of the sequence read from a medium. Main features of the above exemplary embodiments are as follows.

1. In a magnetic recording apparatus, sectors can be output to a buffer in the sequence with which they complete decoding (this being different from the sequence of read gate assertion) by holding a management table for maintaining the integrity of the sequences of sectors in a buffer.
2. The management table referred to at 1 above includes:
(1) pointers for where the corresponding sector should be stored;
(2) a pointer indicating the location in the management table to write the data (1);
(3) a flag indicating whether the corresponding sector has already been stored in the buffer; and
(4) a pointer indicating the position of table data that has already been used and can be discarded.
3. Determination is made at read gate assertion as to whether or not there is space available for storing the corresponding sector in the buffer, and read gate assertion is made only when space is available.
4. The buffer pointer (1) for storing the corresponding sector is held in reserve when read gate assertion is made. The held pointer data is used when the sector is actually stored in the buffer. The flag (3) is set when the sector is stored in the buffer.
5. When the next flag (3) at the position of the pointer (4) has been set the corresponding sector is treated as a valid sector since sequential integrity has been achieved in the buffer.
6. Flag management is removed from the pointer data of a sector that has become a valid sector.
7. The above data is employed during re-trying, reducing processing by not re-reading from the medium sectors that have already been correctly read from the medium.

There is no limitation to the above exemplary embodiments, and various modifications may be implemented within a scope that does not depart from the spirit. Whereas explanation has been given of cases in which the unit (block) of data corresponding to management flags or pointers is a sector, a different unit may be employed for such a block. The sector size also does not necessarily need to be 512 B.

Various configurations can be implemented by appropriate combinations of plural of the configuration elements described in the exemplary embodiments. For example, a number of configuration elements may be omitted from out of the total configuration elements illustrated in the exemplary embodiments. Appropriate combinations of configuration elements from different exemplary embodiments may also be made.

What is claimed is:

1. A magnetic recording apparatus comprising:
   a magnetic disk;
   a magnetic disk control device;
   a buffer configured to read data of block units from corresponding designated read ranges on the magnetic disk; and
   a flag management table configured to store a pointer indicating a respective read location of the buffer for data of each of the block units and a management flag for each of the respective pointers,
   wherein the magnetic disk control device is configured to set the management flag of the pointer corresponding to a given block unit when the data of the given block unit is read to the buffer, to determine a managed subject range within the flag management table, and to remove from the managed subject range a leading management flag that is set for a leading block unit in the managed subject range when it is determined that the leading management flag is set for the leading block unit in the managed subject range.

2. The magnetic recording apparatus of claim 1, wherein a size of the flag management table is determined based on latency.

3. A data reading method for a magnetic recording apparatus comprising a magnetic disk, and a magnetic disk control device, the data reading method comprising:
   reading data of block units from corresponding designated read ranges on the magnetic disk into a buffer;
   storing in a flag management table a pointer indicating a respective read location of the buffer for data of each of the block units and a management flag for each of the respective pointers;
   setting the management flag of the pointer corresponding to a given block unit when the data of the given block unit is read by the magnetic disk control device to the buffer;
   determining a managed subject range within the flag management table; and
   removing from the managed subject range a leading management flag that is set for a leading block unit in the managed subject range when it is determined that the leading management flag is set for the leading block unit in the managed subject range.

4. The data reading method of claim 3, wherein a size of the flag management table is determined based on latency.

* * * * *